US009635022B2

(12) United States Patent
Potonniee

(10) Patent No.: US 9,635,022 B2
(45) Date of Patent: Apr. 25, 2017

(54) METHOD OF ALLOWING ESTABLISHMENT OF A SECURE SESSION BETWEEN A DEVICE AND A SERVER

(71) Applicant: GEMALTO SA, Meudon (FR)

(72) Inventor: Olivier Potonniee, Marseilles (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/651,250

(22) PCT Filed: Nov. 29, 2013

(86) PCT No.: PCT/EP2013/075041
§ 371 (c)(1),
(2) Date: Jun. 11, 2015

(87) PCT Pub. No.: WO2014/090594
PCT Pub. Date: Jun. 19, 2014

(65) Prior Publication Data
US 2015/0312252 A1    Oct. 29, 2015

(30) Foreign Application Priority Data
Dec. 13, 2012 (EP) .................................... 12306576

(51) Int. Cl.
G06F 21/44 (2013.01)
H04L 29/06 (2006.01)
G06F 21/34 (2013.01)

(52) U.S. Cl.
CPC .......... H04L 63/0853 (2013.01); G06F 21/34 (2013.01); H04L 63/083 (2013.01); H04L 63/18 (2013.01)

(58) Field of Classification Search
CPC ................................................. H04L 2463/082
See application file for complete search history.

(56) References Cited

U.S. PATENT DOCUMENTS 8,256,664 B1    9/2012  Balfanz et al.
2002/0120716 A1*  8/2002  Raghunathan .... G06F 17/30067
                                              709/219

(Continued)

OTHER PUBLICATIONS

International Search Report (PCT/ISA/210) mailed on Feb. 20, 2014, by the European Patent Office as the International Searching Authority for International Application No. PCT/EP2013/075041.

(Continued)

Primary Examiner — Josnel Jeudy
(74) Attorney, Agent, or Firm — Buchanan Ingersoll & Rooney PC

(57) ABSTRACT

The invention is a method for allowing a user to establish a secure session between a device and a server by using a username/password associated with the user. The user provides the username for the device. In response to a message comprising the username, the server opens a session and generates an identifier of the session and sends the identifier to the device. The identifier is transmitted to a machine distinct from the device. The user provides the password for the machine. The machine sends an authenticating message to the server, the authenticating message comprises the identifier and an authenticating data generated from the password. The server sends a result message reflecting the result of the authenticating data checking to the device.

9 Claims, 2 Drawing Sheets

(56) References Cited

U.S. PATENT DOCUMENTS

2010/0175123 A1\* 7/2010 Karino .............. H04L 29/12377
                                                            726/12
2016/0063479 A1\* 3/2016 Duan .................... G06Q 20/32
                                                            705/44

OTHER PUBLICATIONS

Written Opinion (PCT/ISA/237) mailed on Feb. 20, 2014, by the European Patent Office as the International Searching Authority for International Application No. PCT/EP2013/075041.
Sanna Suoranta et al., Strong Authentication with Mobile Phone, Information Security, Springer Berlin Heidelberg, Berlin, Sep. 19, 2012, pp. 70-85.

\* cited by examiner

METHOD OF ALLOWING ESTABLISHMENT OF A SECURE SESSION BETWEEN A DEVICE AND A SERVER

FIELD OF THE INVENTION

The present invention relates to methods of allowing the establishment of a secure session between a device and a server. It relates particularly to methods of allowing the establishment of a secure session between a device and a server by authenticating a user through his associated username and password.

BACKGROUND OF THE INVENTION

In a client/server system, an authentication of the client may be required in order to protect access to services or data of the server. The Username & Password scheme is the most widely used technique to authenticate users on servers like web sites. However it suffers from a security weakness. Users often have to type their password on untrusted devices, such as computers that they do not own (e.g. in public places). They can have no guarantee that there is no spyware (like key logger for example) capturing the typed password.

Several other authentication methods have been proposed to replace the username & password scheme, but none of them have succeeded to replace the simple password predominance. This is mostly due to the cost of deployment of these techniques, which often include the deployment of a hardware token, and the usage disruption they imply, for which the users would have to be educated. Secure mechanisms based on Public Key Infrastructure (PKI), Smart cards, or One-Time-Password (OTP) tokens may be expensive and complex to deploy. Storing passwords independently of the used client machine can be done using online services. These services require the user to create an account and imply that the user trusts the service enough to give it all its passwords, which is both a privacy and a security issue.

As long as the Username & Password scheme is managed in a non-secured environment, there is a risk of attack leading to the stealing of credentials used for the authentication of the client machine by the server. In addition, from the server point of view, such an attack may lead to Denial-Of-Service attacks against the server by using the stolen Username & Password couple.

There is a need for strengthening the establishment of a secure session between a device and a server by authenticating a user.

SUMMARY OF THE INVENTION

An object of the invention is to solve the above mentioned technical problem.

The object of the present invention is a method for allowing a user to establish a secure session between a first device and a server by using a username and a password which are associated with the user. The user provides the username for said first device that sends a message comprising the username to the server. The server opens a session, generates an identifier of the session and sends the session identifier to the first device. The identifier is transmitted to a second device distinct from said first device. The user provides the password for said second device. The second device sends an authenticating message to the server. The authenticating message comprises a first reference data based on the session identifier and an authenticating data generated from the password. The server sends a result message reflecting the result of the checking of the authenticating data to the first device.

Advantageously, said first device may send a polling message to the server in order to get the result message, said polling message containing a second reference data based on the session identifier.

Advantageously, the session identifier sent by the server to the first device may be displayed to the user as a two-dimensional code which may be generated either by the server, by said first device, or by a specialized service hosted by another device.

Advantageously, the two-dimensional code may contain an URL to be used by the second device for sending the authenticating message.

Advantageously, thee server may store the authenticating data for a deferred checking of the authenticating data.

Another object of the invention is a server configured to establish a secure session with a first device by using a username and a password that are associated with a user. The first device comprises an interface means able to get the username entered by the user and to send the username to the server. The server comprises a session means able to open a session, to generate an identifier of the session, to send the identifier to the first device and to associate the identifier with the username. The server comprises a checking means adapted to receive an authenticating message from a second device distinct from said first device, the authenticating message comprising a first reference data and an authenticating data. The checking means is adapted to match up the username with the authenticating data if said first reference data matches the identifier. The checking means is adapted to check if the authenticating data has been correctly generated from the password. The checking means is adapted to send a result message reflecting the result of the authenticating data checking in response to a polling message sent by the first device. The checking means is adapted to extract a second reference data from the polling message and to associate the result message with the polling message if said second reference data matches the identifier.

Advantageously, the identifier sent by the server to the first device may be displayed to the user as a two-dimensional code which is generated by the server, said first device or a specialized service hosted by another device.

Advantageously, the two-dimensional code may contain an URL to be used by the second device for sending the authenticating message.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to all kinds of client device intended to establish a secure session with a server by authenticating a user. These client devices may be devices like mobile phones, Personal Computers or Tablet PCs.

Figure 1:
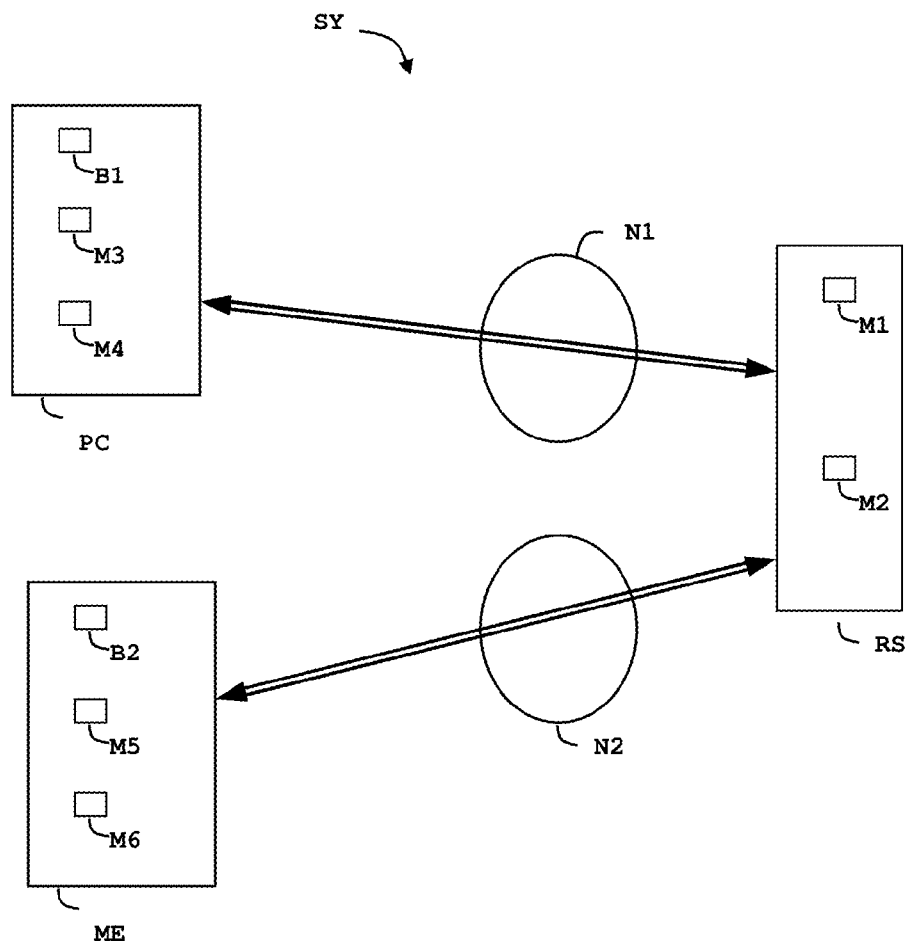
FIG. 1 depicts schematically an example of a system comprising a server and two devices configured to manage the username and password data according to the invention.

FIG. 1 shows schematically an example of architecture of a system SY comprising a server RS, a first device PC and a second device ME according to the invention.

The first device PC is configured to act as a client that needs to establish a secure session with the server RS thanks to the authentication of a user.

In this example, the first device PC is a Personal Computer. The first device PC may also be a tablet, a mobile phone, or any machine intended to access a server and allowing a user to provide his username.

The first device PC comprises a web browser B1 and a manager means M4 which is adapted to get a session identifier from a message provided by the server RS and to store the session identifier. The first device PC comprises a generating means M3 which is adapted to generate a reference data RD2 from the session identifier and to send polling messages comprising the reference data RD2 to the server RS.

The second device ME is a mobile phone. The second device ME may also be a tablet, a personal computer, or any machine intended to communicate with the server RS and allowing a user to provide his password.

The second device ME comprises a web browser B2 and a manager means M6 which is adapted to get a session identifier from an incoming data. Advantageously, the manager means M6 is configured to retrieve the session identifier from a data coming from the first device PC. Alternatively, the manager means M6 is configured to retrieve the session identifier from an incoming message provided by the server RS.

The second device ME comprises a generating means M5 which is adapted to generate a reference data RD1 from the session identifier and to build an authenticating message comprising the reference data RD1 and an authenticating data computed from a password provided by a user.

The server RS comprises a session means M1 which is able to generate an identifier of communication session, to open a session, to send the identifier of the session to a first device and to associate the identifier of session with a username sent by the first device. The server RS comprises a checking means M2 adapted to receive an authenticating message from a second device distinct from said first device. The checking means M2 is configured to extract the reference data RD1 and an authenticating data from an authenticating message received from the second device. The checking means M2 is adapted to match up the username with the extracted authenticating data if the reference data RD1 matches the identifier of the session. The checking means M2 is adapted to check if the extracted authenticating data has been correctly generated from the password corresponding to the username. (i.e. to check if the submitted password is valid) The checking means M2 is adapted to send a result message reflecting the result of the authenticating data checking in response to a polling message received from the first device PC. The checking means M2 is adapted to extract the reference data RD2 from a polling message received from the first device PC and to associate the result message with the polling message if the reference data RD2 matches the identifier of session. The checking means M2 is able to check if the reference data RD2 matches the identifier of session.

The first device PC communicates with the server RS through a first network N1 while the second device ME communicates with the server RS through a second network N2. The second network N2 may be fully distinct from the first network N1 or may be partly distinct from the first network N1. Alternatively, the second network N2 is the first network N1. These networks may be based on a Local Area Network (LAN), a Wireless-LAN (WLAN), Internet, a Telecom network or any relevant wired or wireless communication channels.

The first device PC may communicate with the server RS by using any relevant protocol. In particular, the first device may use HTTPS (HyperText Transfer Protocol Secure). For communicating with the server RS, the second device ME may use the same communication protocol as the first device PC or a different one.

In the present description, the password is a permanent password which is durably associated with a username for a user. The value of the password may be changed according to security rules or user's will. In other words, the password of the invention is not a One-Time-Password (OTP).

Figure 2:
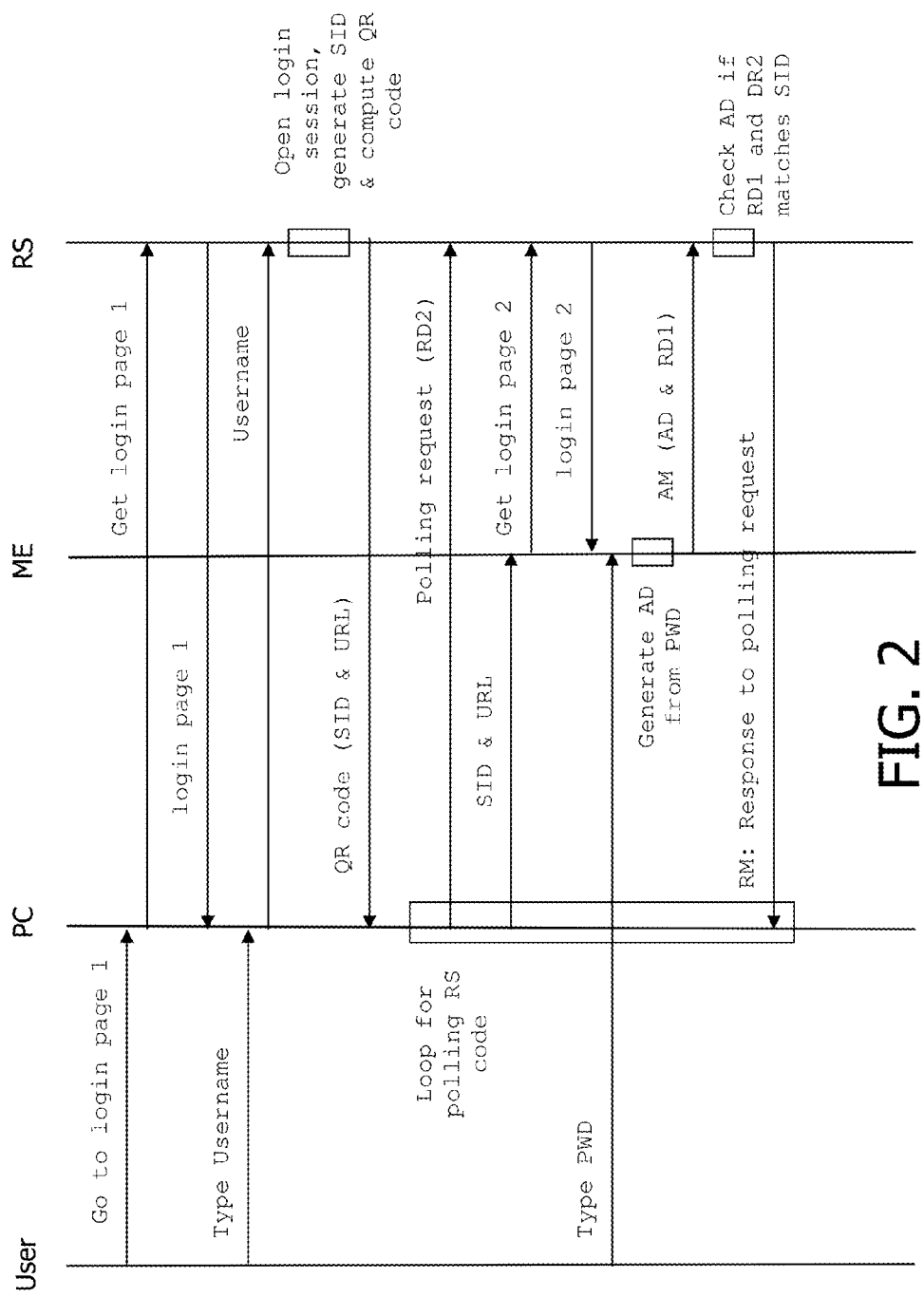
FIG. 2 is an example of a flowchart for establishing a secure session between a first device and a server by using a username and password authentication scheme according to the invention.

FIG. 2 shows an example of a flowchart for establishing a secure session between a first device PC and a server RS by using a username and password authentication scheme according to the invention.

On the first device PC, the user launches the browser B1 ("Go to login page 1") and goes to a page of the web site hosted on the server RS. ("Get login page 1") The page of the targeted site requires a user name and password authentication. The server RS sends back a first login page ("login page 1") to the first device PC. Then the user enters his username on the first device PC. Alternatively, the user may select a username prerecorded in the first device PC. For instance, such a selection may be performed by typing the first letter of the username.

When the user presses the login button of the login page, the username is sent to the server RS. On receipt of the username, the server RS opens a login session and generates a session identifier SID allocated to this session.

Alternatively, the session may have been opened as soon as the first login message ("Get login page 1") was received by the server RS. The server RS generates a two-dimensional code comprising the session identifier SID and a URL corresponding to a second login page. Advantageously, the two-dimensional code may be a QR code (Quick Response code) or a Micro QR code. The server RS sends the two-dimensional code to the first device PC.

The first device PC extracts the session identifier SID from the two-dimensional code and generates a reference data RD2 from the session identifier SID. For example, the reference data RD2 may be set with the value of the session identifier SID. In another example, the reference data RD2 may be computed by ciphering the session identifier SID with a public key corresponding to a secret key known by the server RS.

Alternatively, the server RS does not generate the QR Code and just sends the session identifier SID to the first device PC. Then the browser B1 (actually the web page running in the browser) generates the QR Code. This way the first device PC does not have to extract the session identifier SID since the first device PC directly gets it from the server RS.

Alternatively, the first device PC may request the generation of the QR Code from a specialized service. The specialized service may be hosted by a server (not shown by the Figures) distinct from the server RS.

Then the first device PC starts a loop of polling messages. Each polling message contains the reference data RD2.

The first device PC shows the two-dimensional code in its display. The user reads the two-dimensional code with the second device ME. For instance a dedicated application may be run for automatically reading the two-dimensional code. The second device ME extracts the session identifier SID and the URL (corresponding to a second login page) from the two-dimensional code. On the second device ME, the browser B2 is launched with the retrieved URL and goes to the corresponding page of a web site on the server RS ("Get login page 2"). The server RS sends back a second login page ("login page 2") to the second device ME. Then the user enters his password on the second device ME. Alternatively, the user may select a password prerecorded in the second device ME.

The second device ME generates an authenticating data AD from the password. Advantageously, the authenticating data AD is computed as a hash of the session identifier SID and the password. Alternatively, the authenticating data AD may be equal to the password. The second device ME generates a reference data RD1 from the session identifier SID. For example, the reference data RD1 may be set with the value of the session identifier SID. In another example, the reference data RD1 may be computed by ciphering the session identifier SID with a secret key shared with the server RS. The second device ME builds an authenticating message AM containing the authenticating data AD and the reference data RD1. The second device ME sends the authenticating message AM to the server RS. On receipt of the authenticating message AM, the server RS retrieves the username whose associated session identifier corresponds to reference data RD1. Then the server RS checks the couple username/password is correct by using the authenticating message AM.

On receipt of the next polling message, the server RS extracts the reference data RD2 from the polling message and retrieves the result of the checking of the couple username/password associated with the session identifier corresponding to the reference data RD2. The server RS sends a result message RM to the first device PC. The result message RM reflects the result of the checking of the authenticating data AD by the server RS. Thanks to the result message RM, the first device PC is aware of the session status: either the user has been successfully logged in the server RS for the first device PC or not. The polling message is a request aiming at knowing if a valid password has been submitted by the second device ME.

On the basis of the embodiments described above, several technical alternatives may be deployed.

For example, the two-dimensional code may be devoid of the URL corresponding to a second login page. In this case, the URL is assumed to be entered by the user on the second device ME or to be already known by the second device ME.

For example, the session identifier SID may be sent from the server RS to the second device ME without going through the first device PC. For instance, the second device ME may receive a SMS comprising the session identifier SID. In this case, the session identifier SID is not transferred from the first device PC to the second device ME.

For example, the server RS may send a random to the second device ME (either through the first device PC or directly). The random may be used for computing the authenticating data AD and/or the reference data RD1. The random may be included in the two-dimensional code.

For example, the session identifier SID may be managed on a form different from a two-dimensional code by the server RS and the first device PC. In this case, the session identifier SID (and possibly the URL) may be sent in a textual or binary representation, and presented to the user as readable text. The server RS and the first device PC manage no two-dimensional code in this case.

For example, the receipt of a polling message containing the relevant reference data RD2 triggers the checking of the authenticating data AD by the server RS. In other words, the checking of the authenticating data AD is deferred until the server RS has to send a response to a polling message. The server RS may store the authenticating data AD or the password for a deferred checking.

For example, instead of periodic polling messages, the first device PC may use a single long-lived poll request, to which the server RS will answer when either a password has been received and processed (with a success or failed result), or when a timeout has occurred.

Long-lived polling (also named Long polling) is a variation of the traditional polling mechanism. With long-lived polling, the client device requests data from the server in a similar way to a normal poll. However, if the server does not have any data available for the client device, instead of sending an empty response, the server holds the request and waits for some data to be available. Once the data becomes available on server side, a complete response is sent to the client device. Thus the client device may send only one polling request while the server may send back the response after a long duration.

For example, the invention may be carried out without using any browser on the first and second devices. In this case, a dedicated software is used on the first device PC and/or the second device ME to enter the username and/or password. The dedicated software on the first device PC will be the one accessing the user restricted resources which require authentication. In this scenario, the protocol used to send the username and/or password may be HTTP, or any other suitable communication protocol.

The username and the password are never typed on the same device. Thanks to the invention, the user may choose to type his password on a trusted device, while the username is typed on a less secure machine. The trusted device (i.e. the second device ME) may be chosen independently from the first device PC.

An advantage of the invention is to allow a user to store his password in a trusted environment (i.e. the second device ME), preferably belonging to the user. This avoids having to remember and to re-enter his password regularly. Moreover, since the password(s) stored in the second device ME remains available, the authentication based on username/password may be performed for a plurality of untrusted devices.

The invention claimed is:

1. A computer implemented method for allowing a user to establish a secure session between a first device and a server by using a username and a password associated with the user, the method comprising the following steps:
   opening, by the server, a session;
   generating, by the server, an identifier of the session;
   sending, by the server, the generated identifier to the first device, which is then transmitted to a second device,
   receiving, by the server, from the second device, an authenticating message, said authenticating message including a first reference data based on the identifier and an authenticating data generated from the password,
   sending, by the server, a result message reflecting the result of the authenticating data checking to the first device,
   wherein the second device is distinct from said first device and wherein the method further comprises the following steps:

receiving, by the server, a user-provided username for said first device without receiving the password for said first device, said user-provided username being received in a message from said first device; and receiving, by the server, a user-provided password for said second device without receiving the username for said second device.

2. A method according to claim 1, wherein said server receives, from said first device, a polling message requesting the result message, said polling message containing a second reference data based on the identifier.

3. A method according to claim 1, wherein the identifier sent by the server to the first device is displayed to the user as a two-dimensional code, generated either by the server, said first device, or a specialized service hosted by another device.

4. A method according to claim 3, wherein the two-dimensional code contains an URL to be used by the second device for sending the authenticating message.

5. A method according to claim 1, wherein the server stores the authenticating data for a deferred checking of the authenticating data.

6. A server computer configured to establish a secure session with a first device by using a username and a password associated with a user, the first device comprising an interface configured to obtain the username entered by the user and to send the username to the server, wherein the server computer includes instructions stored thereon that, when executed, causes said server computer to:
- send, by the server computer, a first login page to said first device, said first login page enabling a user to provide the username for said first device without provision of said password for said first device,
- send, by the server computer, a second login page to a second device distinct from said first device, said second login page enabling the user to provide the password for said second device without provision of said username for said second device,
- open, by the server computer, a session, to send an identifier of the session to said first device and to associate the identifier with the username,
- receive, by the server computer, an authenticating message from the second device, said authenticating message comprising a first reference data and an authenticating data,
- match up, by the server computer, the username with the authenticating data if said first reference data matches the identifier and check if the authenticating data has been correctly generated from the password,
- send, by the server computer, a result message reflecting the result of the authenticating data checking in response to a polling message sent by the first device, and
- extract, by the server, computer, a second reference data from the polling message and associate the result message with the polling message if said second reference data matches the identifier.

7. A server computer according to claim 6, wherein the identifier sent by the server computer to the first device is configured to be displayed to the user as a two-dimensional code, generated either by the server computer, said first device, or a specialized service hosted by another device.

8. A server computer according to claim 7, wherein the two-dimensional code contains an URL to be used by the second device for sending the authenticating message.

9. A system comprising:
- a server;
- a first device; and
- a second device,
- wherein the server is configured to establish a secure session with the first device by using a username and a password associated with a user and includes instructions stored thereon that, when executed, causes said server to:
  - send a first login page to said first device, said first login page enabling the user to provide the username for said first device without provision of said password for said first device,
  - send a second login page to the second device distinct from said first device, said second login page enabling the user to provide the password for said second device without provision of said username for said second device,
  - open a session, to send an identifier of the session to said first device and to associate the identifier with the username,
  - receive an authenticating message from the second device, said authenticating message comprising a first reference data and an authenticating data,
  - match up the username with the authenticating data if said first reference data matches the identifier and check if the authenticating data has been correctly generated from the password,
  - send a result message reflecting the result of the authenticating data checking in response to a polling message sent by the first device, and
  - extract a second reference data from the polling message and associate the result message with the polling message if said second reference data matches the identifier,
- wherein said second device is configured to generate said first reference data and to build the authenticating message, and
- wherein said first device is configured to generate said second reference data and to build the polling message.

* * * * *